Nov. 27, 1945.　　　L. F. MAYLE　　　2,389,991
MOSAIC SENSITIVITY INDICATOR
Filed March 18, 1943
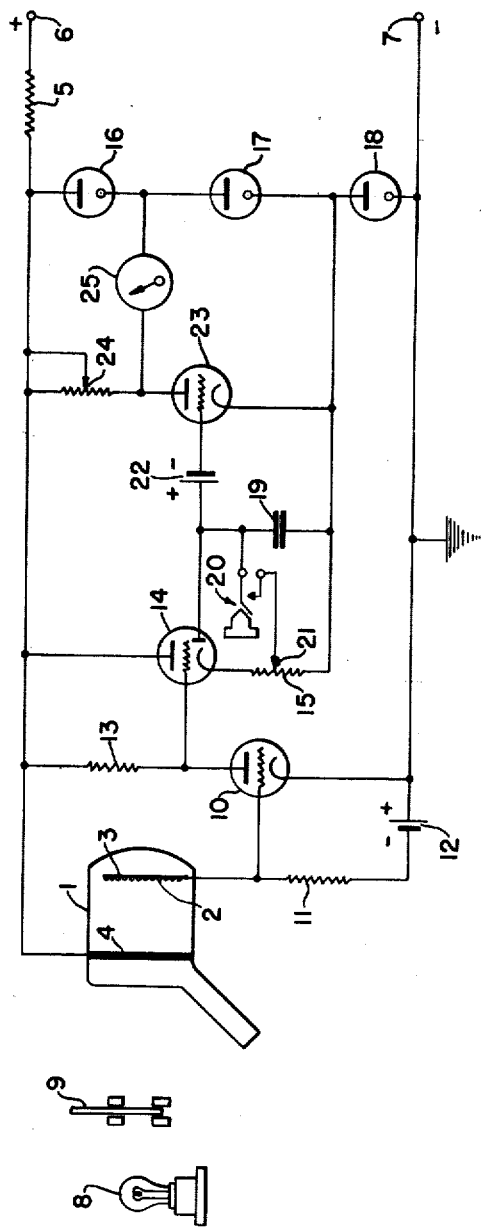
INVENTOR
LOUIS F. MAYLE
BY
ATTORNEY Patented Nov. 27, 1945

2,389,991

UNITED STATES PATENT OFFICE 2,389,991

MOSAIC SENSITIVITY INDICATOR

Louis F. Mayle, Fort Wayne, Ind., assignor to Farnsworth Television and Radio Corporation, a corporation of Delaware Application March 18, 1943, Serial No. 479,565

9 Claims. (Cl. 315—368)

This invention relates to testing apparatus and particularly to apparatus for producing sustained indications of transient effects.

According to conventional practice in the determination of the merit of a television iconoscope tube, certain performance tests are made. One of these is a test to determine quantitatively the photosensitivity of the mosaic surface. Such a test frequently is made during the mosaic activation stage while the tube is being constructed. Since the mosaic is an insulator, the photoemissivity of its surface can be determined only by making transient measurements.

One method is to flash a light impulse of known intensity and duration upon the mosaic. In this method a known potential is applied continuously between the second anode of the tube and the signal plate associated with the mosaic. In another method the mosaic is constantly illuminated with light of known intensity and a potential impulse of known magnitude is applied between the second anode and the signal plate for a known period. In either case a transient voltage is developed at the signal plate, the peak value of which is a function of the emission from the mosaic.

As is well understood in the art, however, it is difficult to determine quantitatively the peak value of such a transient voltage with accuracy. A ballistic galvanometer is sometimes used for making such a determination. Frequently a vacuum tube meter is substituted for the galvanometer. Either of these instruments is energized for only the short transient period of the impulse and it is necessary to observe the maximum deflection within this period. Hence, observation errors are inevitable and preclude accurate quantitative determination of the mosaic sensitivity.

An object of the invention, therefore, is to provide novel apparatus for giving sustained indications of transient effects of short time duration.

Another object of the invention is to provide a novel vacuum tube voltmeter whereby to effect a sustained deflection thereof which is proportional to the peak value of a transient voltage.

Another object of the invention is to provide improved apparatus for determining quantitatively the photosensitivity of an iconoscope mosaic.

In accordance with the instant invention, there is provided a vacuum tube meter including an electronic discharge device having input and output circuits and a current sensitive device connected to the output circuit. The operation of the electronic device is controlled by a condenser connected to its input circuit. The condenser, in turn, is connected for response to a circuit to which there is applied the transient electrical effect for which it is desired to produce a sustained deflection of the current sensitive device. The condenser is connected to the circuit in which the transient effect appears by a unilaterally conducting device, whereby the potential of the condenser electrodes accurately follows the transient effect to the limit of its excursion in one sense, but is prevented from following the transient effect in its return to the normal condition.

Where such a device is to be used for the determination of the photosensitivity of an iconoscope mosaic surface the transient effect is produced by flashing light of a known intensity and for any time duration upon the mosaic. The charge which is developed upon the signal plate of the iconoscope is amplified to produce a transient voltage drop across a resistance element. The condenser charge is permitted to change in correspondence with the transient voltage and is maintained at the limiting or peak value thereof by means of a rectifier connected between the resistance element and the condenser in such a manner to prevent the charge on the condenser from reverting to its initial value.

Since the charge on the condenser constitutes the control voltage for the electronic device of the vacuum tube meter, the condition of this device is changed from a normal or zero condition to one corresponding to the charge of the condenser. Since this charge is proportional to the photosensitivity of the mosaic and is maintained after the transient voltage which produced it, the indication given by the vacuum tube meter is a measure of the emission from the mosaic and is sustained so that it may be noted with ease and accuracy.

For a better understanding of the invention together with other and further objects thereof, reference is had to the following description taken in connection with the accompanying drawing, and its scope will be pointed out in the appended claims.

In the accompanying drawing:

The single figure is a circuit diagram of apparatus for testing the photosensitivity of the mosaic surface of an iconoscope tube in accordance with the instant invention.

Referring now to the drawing, there is shown an iconoscope tube 1 having a mosaic surface 2, a signal plate 3 and a collector 4. The collector is connected through a resistor 5 to a source of positive potential. This potential may be derived from an alternating current source by rectification. The unidirectional potential is impressed upon positive and negative terminals 6 and 7 respectively. The magnitude of the voltage applied to the collector 4 is sufficient to be well above the knee of the curve representing a plot of the photoelectric current against the collector voltage. In other words, the collector voltage should cause operation of the device in the saturation region.

For the purpose of flashing light upon the mosaic surface 2 of the iconoscope there is provided a source of light such as a lamp 8 which is in a position to illuminate a predetermined portion of the mosaic. Interposed between the lamp and the mosaic surface is an aperture which is normally closed by a shutter 9. This element may be a conventional camera shutter or its equivalent. In order to prevent any light except that from the lamp 8 from reaching the mosaic surface, the iconoscope may be placed in a suitable light-tight housing having an aperture closed by the shutter 9, or it may be located in a dark room.

The signal plate 3 is connected to the control grid of a vacuum tube 10 which may be a 6SF5 type or its equivalent. The control grid of this tube is also connected through a relatively large resistor 11 and a biasing battery 12 to ground. The purpose of this battery is to bias the grid of the tube at a sufficiently negative potential with respect to its associated cathode, that at no time will a positive pulse of voltage from the signal plate 3 drive the grid into the positive potential region. The anode of the tube is connected through a load resistor 13 and the resistor 5 to the positive direct current terminal 6.

The anode of the tube 10 is also connected to the grid of another vacuum tube 14 which may be a 6SR7 type or its equivalent. The triode portion of this tube functions as a cathode follower. The triode anode is connected through resistor 5 to the positive direct current terminal 6, and the cathode is connected through a relatively small cathode follower resistor 15 to an intermediate point on a voltage divider. This voltage divider comprises a series arrangement of resistor 5 and three voltage regulator tubes 16, 17 and 18, and is connected between the positive and negative direct terminals 6 and 7. The function of the resistor 5 is to limit the current flow through the regulator tubes to a predetermined value.

The tube 14 is also provided with a diode anode. Associated with this portion of the tube 14 is a control condenser 19 which is connected between the diode anode and the junction of the cathode follower resistor 15 with the point on the voltage divider between the regulator tubes 17 and 18. A push button switch 20 having contacts which are normally open, is connected between the plate of the condenser 19 which is associated with the diode anode and a slider element 21 associated with the cathode follower resistor 15.

The condenser 19 is connected in series with a biasing battery 22 to the input circuit of a vacuum tube 23. This tube may be a 6J5 type or its equivalent and is a part of a vacuum tube voltmeter. The function of the battery 22 is to bias the grid of the tube 23 so that its operation is at all times in the negative grid region. The anode of the tube 23 is connected through a load resistor comprising a potentiometer 24 and the resistor 5 to the positive terminal 6 of the direct current supply. Also connected between the anode of this tube and the intermediate point on the voltage divider between the regulator tubes 16 and 17 is a current sensitive device such as a microammeter 25.

Referring now to the operation of the apparatus, it is assumed that, before a test of the mosaic surface is made, the potentiometer 24 is adjusted temporarily so that the anode current flowing through the tube 23 is of the proper magnitude to produce an anode voltage which is different from the voltage on the voltage divider at the point between the regulator tubes 16 and 17. In this case there will be produced a deflection of the indicator of the microammeter 25. The slider 21 is adjusted then to a point on the cathode follower resistor 15 which is equal in potential to the potential of the diode anode of the tube 14. This potential differs from the potential of the cathode of this tube by an amount equal to the value of the contact potential between these elements of the diode. Such a potential exists inherently between electrodes of unlike metals. This adjustment is made with the aid of the push button switch 20 by alternately making and breaking the contact thereof. The slider element 21 is adjusted by trial and error until there is produced no change in the deflection of the microammeter, irrespective of whether the push button controlled circuit is open or closed.

The potentiometer 24 then is readjusted so as to produce an anode potential of the tube 23 which is equal to the voltage on the voltage divider between the regulator tubes 16 and 17. Such an adjustment produces a zero indication by the pointer of the microammeter 25.

With the push button in its normal position, a light impulse of known intensity is flashed upon the mosaic surface 2 by actuating the shutter member 9. A transient voltage in the form of a positive impulse is developed across the grid resistor 11 and thereby increases the conduction of space current in the tube 10. Accordingly, there is developed by the anode resistor 13, a potential at the anode of the tube which is of a less positive magnitude than that which existed prior to the generation of the light impulse. Consequently, conduction in the triode section of the tube 14 is decreased. The potential which is developed across the cathode follower resistor 15 thereby is rendered less positive and the charge on the condenser 19 accurately follows this voltage reduction.

This may be seen if it is assumed that the lower plate of the condenser and the lower terminal of the resistor 15 are maintained at the same potential at all times by the regulator tube 18. Just prior to the development of the light impulse, the upper plate of the condenser is at the same potential as the slider element 21 or diode plate of the tube 14 which differs from the potential of the cathode of the tube by the amount of the contact potential. When the potential of the cathode is reduced in response to the light impulse, the upper plate of the condenser, being more positive, is permitted to follow this potential decrease by reason of the illustrated poling of the diode section of the tube 14. The diode permits the conduction of current from the upper plate of the condenser to the cathode follower resistor so that the condenser charge may be dissipated until the upper plate thereof acquires the lowest potential (less the contact potential of the diode) which the cathode reaches during the period of the transient effect.

When, during the following portion of the transient period, the voltage developed across the resistor 15 increases, the upper plate of the condenser 19 is not permitted to follow this potential change. This may be seen by considering that this would require the flow of charging current from the upper terminal of the resistor 15 to the upper plate of the condenser 19. Such a current flow is prevented because of the unilateral conducting characteristic of the diode section of the tube 14. Consequently, when the voltage of the cathode returns to its normal value, the condenser 19 is charged to a considerably lower value. This lower value is representative of the photosensitivity of the mosaic surface 2 from which the transient voltage effect was produced.

By reducing the positive charge on the condenser 19, the conduction of space current in the tube 23 is reduced correspondingly in an amount corresponding to the photosensitivity of the mosaic surface. The reduction of space current in this tube develops a more positive anode potential which, when applied to the microammeter 25 produces a corresponding deflection of the indicator thereof. Obviously, the magnitude of this deflection is representative of the photosensitivity of the mosaic electrode. Also, the indication is sustained for a substantial period of time by reason of the maintenance of the charge on the control condenser 19. Consequently, the magnitude of the deflection may be determined with considerable accuracy.

Having noted the deflection of the mircoammeter 25 and desiring to make a similar test on another portion of the mosaic surface 2, the push button switch 20 is momentarily closed, thereby shunting the diode section of the tube 14 and permitting the condenser 19 to be charged to the potential of the slider member 21. This operation will restore the pointer of the microammeter 25 to its zero position and, the cycle of operations may be repeated as described.

While there has been described what, at present, is considered the preferred embodiment of the invention, it will be obvious to those skilled in the art that various changes and modifications may be made therein without departing from the invention, and therefore, it is aimed in the appended claims to cover all such changes and modifications as fall within the true spirit and scope of the invention.

What is claimed is:

1. Apparatus for producing a sustained indication of a transient voltage comprising, a vacuum tube meter including an electronic discharge device and a current sensitive device controlled thereby, a series circuit comprising a resistor, a rectifier and a condenser, an amplifier tube responsive to said transient voltage, means including said amplifier tube for impressing upon said resistor a predetermined normal voltage, means to charge said condenser substantially to said normal voltage, means for impressing an abnormal transient voltage upon said resistor, said rectifier being poled to charge said condenser substantially to said abnormal voltage and to prevent said condenser charge from subsequently reverting to said normal voltage, and means for controlling said vacuum tube meter by said condenser charge, whereby to produce a sustained deflection by said current sensitive device indicative of said abnormal voltage.

2. A mosaic sensitivity indicator comprising electrostatically controlled indicating apparatus, a series circuit including a resistor, a rectifier and a condenser, means for developing in said resistor a predetermined voltage representative of an unsensitized mosaic, means to charge said condenser substantially to said predetermined voltage, means for developing in said resistor a transient voltage representative of the photosensitivity of the mosaic, said rectifier being poled to charge said condenser substantially to said transient voltage and to prevent said condenser charge from subsequently reverting to said predetermined voltage, and means employing said condenser charge for actuating said indicating apparatus, whereby to produce a sustained indication thereby indicative of the photosensitivity of said mosaic.

3. A mosaic sensitivity indicator comprising, indicating apparatus including a current sensitive device, a series circuit including a resistor, a rectifier and a condenser, means for developing in said resistor a predetermined normal voltage, means to charge said condenser substantially to said normal voltage, means for developing in said resistor an abnormal transient voltage representative of the photosensitivity of the mosaic, said rectifier being poled to charge said condenser substantially to said abnormal voltage and to prevent said condenser charge from subsequently reverting to said normal voltage, and means including said condenser for actuating said indicating apparatus, whereby to produce a sustained deflection by said current sensitive device indicative of the photosensitivity of said mosaic.

4. A mosaic sensitivity indicator comprising, a vacuum tube meter including a vacuum tube and a current sensitive device controlled thereby, a series circuit including a resistor, a rectifier and a condenser, means for developing in said resistor a predetermined normal voltage, means to charge said condenser substantially to said normal voltage, means for developing in said resistor an abnormal transient voltage representative of the photosensitivity of the mosaic, said rectifier being poled to charge said condenser substantially to said abnormal voltage and to prevent said condenser charge from subsequently reverting to said normal voltage, and means including said condenser for actuating said vacuum tube meter, whereby to produce a sustained deflection by said current sensitive device indicative of the photosensitivity of said mosaic.

5. A mosaic sensitivity indicator comprising, a vacuum tube meter including a vacuum tube and a current sensitive device controlled thereby, a series circuit including a resistor, a rectifier and a condenser, an amplifier having said resistor included in the output circuit thereof, means including said amplifier for developing in said resistor a predetermined normal voltage, means including a short-circuiting switch for said rectifier to charge said condenser substantially to said normal voltage, means including said amplifier for developing in said resistor an abnormal transient voltage representative of the photosensitivity of the mosaic, said rectifier being poled to charge said condenser substantially to said abnormal voltage and to prevent said condenser charge from subsequently reverting to said normal voltage, and means including connections from said condenser to said vacuum tube for actuating said vacuum tube meter, whereby to produce a sustained deflection by said current sensitive device indicative of the photosensitivity of said mosaic.

6. A mosaic sensitivity indicator comprising, a vacuum tube meter including a vacuum tube having input and output circuits and a current sensitive device connected to said output circuit, a condenser connected to said input circuit to control said output circuit in accordance with potentials impressed upon said condenser, a resistor, means responsive to a light impulse flashed upon said mosaic to decrease momentarily the potential developed across said resistor, and means including a rectifier to charge said condenser to said decreased potential, said rectifier serving to prevent said condenser potential from increasing subsequently, whereby to produce a sustained indication by said current sensitive device representative of the photosensitivity of said mosaic.

7. A mosaic sensitivity indicator comprising, a vacuum tube meter including a vacuum tube having input and output circuits and a current sensitive device connected to said output circuit, a condenser connected to said input circuit to control said output circuit in accordance with potentials impressed upon said condenser, a resistor, means for controlling the current flow through said resistor, said control means being responsive to a light impulse flashed upon said mosaic to decrease momentarily said current in an amount corresponding to the photosensitivity of said mosaic, whereby to produce a corresponding momentary decrease in the potential developed across said resistor, and means including a rectifier to charge said condenser to said decreased potential said rectifier serving to prevent said condenser potential from increasing subsequently, whereby to produce a sustained indication by said current sensitive device representative of the photosensitivity of said mosaic.

8. A mosaic sensitivity indicator comprising, a vacuum tube meter including a vacuum tube having input and output circuits and a current sensitive device connected to said output circuit, a condenser connected to said input circuit to control said output circuit in accordance with potentials impressed upon said condenser, a resistor, means for controlling the current flow through said resistor, said control means being responsive to a light impulse flashed upon said mosaic to decrease momentarily said current in an amount corresponding to the photosensitivity of said mosaic, whereby to produce a corresponding momentary decrease in the potential developed across said resistor, and means including a rectifier connecting said resistor and said condenser to charge said condenser to said decreased potential, said rectifier serving to prevent said condenser potential from increasing subsequently, whereby to produce a sustained indication by said current sensitive device representative of the photosensitivity of said mosaic.

9. A mosaic sensitivity indicator comprising, a vacuum tube meter including a vacuum tube having input and output circuits and a current sensitive device connected to said output circuit, a condenser connected to said input circuit to control said output circuit in accordancce with potentials impressed upon said condenser, a resistor, means including an amplifier for controlling the current flow through said resistor, means responsive to a light impulse flashed upon said mosaic to decrease momentarily said current in an amount corresponding to the photosensitivity of said mosaic, whereby to produce a corresponding momentary decrease in the potential developed across said resistor, and means including a rectifier connecting said resistor and said condenser to charge said condenser to said decreased potential, said rectifier serving to prevent said condenser potential from increasing subsequently, whereby to produce a sustained indication by said current sensitive device representative of the photosensitivity of said mosaic.

LOUIS F. MAYLE.

---

CERTIFICATE OF CORRECTION.

Patent No. 2,389,991.  November 27, 1945.

LOUIS F. MAYLE.

It is hereby certified that error appears in the printed specification of the above numbered patent requiring correction as follows: Page 3, first column, lines 59 and 60, claim 1, strike out the words "including said amplifier tube" and insert the same after "means" in line 63, same claim; and that the said Letters Patent should be read with this correction therein that the same may conform to the record of the case in the Patent Office.

Signed and sealed this 12th day of February, A. D. 1946.

Leslie Frazer (Seal)  First Assistant Commissioner of Patents.

having input and output circuits and a current sensitive device connected to said output circuit, a condenser connected to said input circuit to control said output circuit in accordance with potentials impressed upon said condenser, a resistor, means responsive to a light impulse flashed upon said mosaic to decrease momentarily the potential developed across said resistor, and means including a rectifier to charge said condenser to said decreased potential, said rectifier serving to prevent said condenser potential from increasing subsequently, whereby to produce a sustained indication by said current sensitive device representative of the photosensitivity of said mosaic.

7. A mosaic sensitivity indicator comprising, a vacuum tube meter including a vacuum tube having input and output circuits and a current sensitive device connected to said output circuit, a condenser connected to said input circuit to control said output circuit in accordance with potentials impressed upon said condenser, a resistor, means for controlling the current flow through said resistor, said control means being responsive to a light impulse flashed upon said mosaic to decrease momentarily said current in an amount corresponding to the photosensitivity of said mosaic, whereby to produce a corresponding momentary decrease in the potential developed across said resistor, and means including a rectifier to charge said condenser to said decreased potential said rectifier serving to prevent said condenser potential from increasing subsequently, whereby to produce a sustained indication by said current sensitive device representative of the photosensitivity of said mosaic.

8. A mosaic sensitivity indicator comprising, a vacuum tube meter including a vacuum tube having input and output circuits and a current sensitive device connected to said output circuit, a condenser connected to said input circuit to control said output circuit in accordance with potentials impressed upon said condenser, a resistor, means for controlling the current flow through said resistor, said control means being responsive to a light impulse flashed upon said mosaic to decrease momentarily said current in an amount corresponding to the photosensitivity of said mosaic, whereby to produce a corresponding momentary decrease in the potential developed across said resistor, and means including a rectifier connecting said resistor and said condenser to charge said condenser to said decreased potential, said rectifier serving to prevent said condenser potential from increasing subsequently, whereby to produce a sustained indication by said current sensitive device representative of the photosensitivity of said mosaic.

9. A mosaic sensitivity indicator comprising, a vacuum tube meter including a vacuum tube having input and output circuits and a current sensitive device connected to said output circuit, a condenser connected to said input circuit to control said output circuit in accordancce with potentials impressed upon said condenser, a resistor, means including an amplifier for controlling the current flow through said resistor, means responsive to a light impulse flashed upon said mosaic to decrease momentarily said current in an amount corresponding to the photosensitivity of said mosaic, whereby to produce a corresponding momentary decrease in the potential developed across said resistor, and means including a rectifier connecting said resistor and said condenser to charge said condenser to said decreased potential, said rectifier serving to prevent said condenser potential from increasing subsequently, whereby to produce a sustained indication by said current sensitive device representative of the photosensitivity of said mosaic.

LOUIS F. MAYLE.

---

CERTIFICATE OF CORRECTION.

Patent No. 2,389,991.            November 27, 1945.

LOUIS F. MAYLE.

It is hereby certified that error appears in the printed specification of the above numbered patent requiring correction as follows: Page 3, first column, lines 59 and 60, claim 1, strike out the words "including said amplifier tube" and insert the same after "means" in line 63, same claim; and that the said Letters Patent should be read with this correction therein that the same may conform to the record of the case in the Patent Office.

Signed and sealed this 12th day of February, A. D. 1946.

Leslie Frazer (Seal)              First Assistant Commissioner of Patents.